United States Patent [19]
Krusche et al.

[11] Patent Number: 5,864,867
[45] Date of Patent: Jan. 26, 1999

[54] MEMORY MANAGEMENT SYSTEM OF A COMPUTER SYSTEM

[75] Inventors: Stefan Krusche, Dachau; Dirk Lukas, Graefelfing; Gerhard Sommer, Baierbrunn, all of Germany

[73] Assignee: Siemens Aktiengesellschaft, Munich, Germany

[21] Appl. No.: 529,851

[22] Filed: Sep. 18, 1995

[30] Foreign Application Priority Data

Sep. 19, 1994 [EP] European Pat. Off. .............. 94114739

[51] Int. Cl.$^6$ .................................................. G06F 12/02
[52] U.S. Cl. ......................... 707/104; 707/101; 711/171
[58] Field of Search .............................. 395/497.01, 611, 395/612, 615; 707/100, 101, 104; 711/170, 171, 172, 173, 153

[56] References Cited

U.S. PATENT DOCUMENTS

| | | |
|---|---|---|
| 4,468,728 | 8/1984 | Wang . |
| 5,446,887 | 8/1995 | Berkowitz .............................. 395/612 |
| 5,475,837 | 12/1995 | Ishak ...................................... 395/612 |
| 5,490,274 | 2/1996 | Zbikowski .............................. 395/439 |
| 5,522,068 | 5/1996 | Berkowitz .............................. 395/612 |
| 5,557,786 | 9/1996 | Johnson ................................. 395/612 |
| 5,561,786 | 10/1996 | Morse ................................. 395/497.01 |

FOREIGN PATENT DOCUMENTS

| | | |
|---|---|---|
| A-2 0453 093 | 10/1991 | European Pat. Off. . |
| WO-94/02898 | 2/1994 | WIPO . |

OTHER PUBLICATIONS

S.L. Goncharsky, et al., "Use of Binary Trees for Storage Allocation," IBM Technical Disclosure Bullentin, vol. 24, No. 6, Nov. 1981.

N.M. Pitman, et al., "Buddy Systems with Selective Splitting," 8199 The Computer Journal, 29, No. 2, Cambridge, Great Britai, pp. 127–134 (Apr. 1986).

Primary Examiner—Tod R. Swann
Assistant Examiner—Christopher S. Chow
Attorney, Agent, or Firm—Hill & Simpson

[57] ABSTRACT

A memory management system for computer systems using a static tree management structure (RIT) for the free memory. Such structure enables short access times to the free memory without negatively influencing the data protection and availability. Such structure is particularly useful in real-time systems.

19 Claims, 5 Drawing Sheets

| PATTERN | PTR_NEXT_PHYS | PTR_NEXT_LOG | PTR_PREV_LOG |
|---|---|---|---|
| BLOCK_LENGTH | PTR_PREV_PHYS | | |

MEMORY MANAGEMENT SYSTEM OF A COMPUTER SYSTEM

BACKGROUND OF THE INVENTION

The invention is directed to memory management systems for computer systems.

Computer memory management systems, particularly for real-time systems, should assure short access times and high file packing density. Further, data protection and availability are other critical demands made of such memory management systems.

A memory management system for managing a pool of data of variable lengths manages the memory space it manages in the form of memory blocks of different lengths. The lengths of the individual memory blocks derive from the sequence of memory requests and memory releases. Subsections that become free are united with adjoining, free subsections (this is known as smelting).

The memory management system usually makes use of an occupied list and a free list for the implementation of jobs. Various methods for searching the free list are known when assigning memories.

In what is referred to as the first-fit method, a search is started at the beginning of the memory space to be managed and the first block that is adequate in terms of length is allocated to the user.

In what is referred to as the next-fit method, the first block that is adequate in terms of length is likewise allocated to the user; the search, however, begins with that block that was last allocated to a user.

In what is referred to as the best-fit method, a search is carried out until that block comprising the smallest possible block that is adequate in terms of length has been found.

What is referred to as the buddy method is available as an alternative for memory management with an occupied list and a free list. The buddy method requires n free lists for the management of $2^n$ byte of memory. Those free blocks having the size $2^k$ are managed in a $k^{th}$ list. When a memory area having the length m is then requested, the smallest free block that is greater than m is halved until a further halving would yield a block smaller than m. One of the two blocks that arose in the last halving is occupied. The other blocks that arose in the halvings are entered into the respective free lists. Upon release of a block, blocks are respectively smelted until a further smelting is no longer possible because, for example, the second half is occupied. This smelting, however, is comparatively improbable since exactly two blocks of the same size must be free next to one another as a prerequisite. There is thus the tendency that larger blocks, i.e. blocks that are already rare are, in particular, no longer efficiently managed during ongoing operations.

The buddy system thus has the disadvantage that it leaves the memory unused between the actual request and the next-higher power of two.

A further disadvantage of the buddy system occurs in a protection-critical management structure where a great number of splittings and, thus, critical rechainings in the free chains can become necessary under certain circumstances for the occupation of a block having a "small" size. This is the normal case particularly at the beginning of the occupation.

The disadvantage of the best-fit method is the relatively long search times and frequent splitting/smelting.

The disadvantage of the first-fit method is that it requires a high frequency of splitting/smelting and results in too low of a file packing density.

A further alternative for the management of free memory is to use a dynamic tree sorted according to block lengths whose individual nodes accept the respective management data of a block. The critical advantage of this type of free memory management is a fast best-fit access when searching for a free block. At the same time, however, this type of management has the following, serious disadvantages:

In order to be able to maintain said advantage over the long-term, a regular rebalancing of the tree would be required.

In general, a request or, respectively, release of a memory block (or, potentially, of a plurality of blocks) would involve a rebalancing of the tree. Access to the free memory management would have to be inhibited during this time.

As a result of the needed rebalancing, the overall structure would often be manipulated to a great extent, as a result whereof the probability of chaining errors would greatly increase. An auditing increase would be necessary for compensation.

For reasons of data protection, the dynamic tree would have to be kept semi-permanent. Every header modified in a rebalancing would thus appear as a location in the disk notebook linked with the corresponding transaction.

The memory management system should be kept open with garbage collection in view of a possible expansion. In the case of a dynamic tree structure, the memory upheavals connected with the garbage collection would lead to substantial rechainings within the tree, which would in turn lead to the aforementioned problems.

As a fundamental problem of a free memory management based on a best-fit search, an accumulation of small, relatively unusable blocks would occur, these deriving as fractions due to splitting (block splitting) in a preceding selection of blocks that were "somewhat" too large.

SUMMARY OF THE INVENTION

An object of the invention is to provide a memory management system for managing a pool of data of variable lengths that enables short access times without deteriorating data protection and availability.

To that end, in an embodiment the invention provides a memory management system for a computer system that manages the free memory of the computer system in the form of blocks and makes these blocks available on request to a user system, the memory management system having management structure comprising a static tree structure having end nodes under which blocks of the free memory are accepted.

A short access time to the free memory blocks is achieved by the use of a tree structure. As a result of the static fashioning of the tree structure, error-conditioned modifications of the tree structure during operation of the real-time system are precluded. Data protection and constant availability are thus assured.

In an embodiment of the invention, the free memory is subdivided into discrete block lengths, whereby the discrete block lengths are statically predetermined and respective blocks of a specific, discrete block length are accepted under an end node of said tree structure.

By introducing a granularity, i.e. the static impressing of specific block lengths, the file packing, on the one hand, is efficiently increased compared to the pure best-fit method since the typical accumulation of the unusable, small split fragments typical of the best-fit method is avoided; second, the access time is shortened due to the less frequent requirement of splitting and smelting compared to the best-fit method.

In an embodiment of the invention, the static tree structure is a binary tree structure.

The access to the leaves of the tree ensues in the form of a binary search by forming the static search structure as a binary tree. The search is thus extremely fast.

In an embodiment of the invention, the tree structure is subdivided into hierarchic tree levels, whereby each tree level subdivides the free memory into blocks having a spectrum of block lengths predetermined by tree level rankings and the lowest tree level ranking subdivides the spectrum predetermined for it into discrete block lengths, and whereby the end node of a tree of a tree level respectively contains information about the plurality of free blocks available overall under this end node.

The use of a plurality of tree levels makes it possible in the search for a suitable block to already recognize at the end node of the first tree level whether the sub-tree accessible via the end node is empty. When such an empty sub-tree is encountered during the search, a different sub-tree can be directly referenced without having to run through the structure of the empty sub-tree up to the end node thereof. The average access time is thereby further increased.

In an embodiment of the invention, there is provided a splitting mechanism that implements a block splitting before every allocation of a found block to a user system when the found block does not comprise the requested block length; and by a smelting mechanism that checks after every release of a block ensuing by a user system to see whether a block physically neighboring this block is likewise free and, insofar as this is the case, smelts the two blocks to one another.

What this development assures is that, on the one hand, no memory space is wasted in the allocation of a block (optimum file packing!) and, on the other hand, the tree structure nonetheless remains balanced (optimum access time!).

In an embodiment of the invention, there is provided a reference mechanism that references the next sub-spectrum for the continuing search when encountering an empty block length.

This development assures that a usable fractional block is linked into the management structure again after a block splitting. This likewise produces a balanced tree structure and, thus, a minimum access time.

In an embodiment of the invention, there is provided a reference mechanism that references the k-fold block length when encountering an empty block length that has been requested and splits a block found under the k-fold block length into small k blocks having the requested block length before the allocation to the user system.

As a result of this development, an empty block length discovered within the framework of a request is immediately re-filled with blocks, i.e. still during the framework of this request.

In an embodiment of the invention, there is provided a registration means that registers the degree of a container structure for acceptance of blocks having a specific block length and/or registers the request frequency of blocks of a specific block length.

This development enables balancing mechanisms to be initiated that intentionally influence the degree of filling of container structures only as needed in order to thus work toward a balanced tree structure. A user-specific block length profile can also be thereby produced during operation, the subdivision of the length intervals of a new management structure matched to this application being capable of being defined according to this user-specific block length profile.

In an embodiment of the invention, there is provided a filling mechanism that refills a container structure with blocks by block splitting when the degree of filling falls below a specific threshold.

In an embodiment of the invention, there is provided a suppression mechanism that suppresses a smelting of a block that has been released with a physical neighboring block when the degree of filling of the container structure belonging to the released block falls below a specific threshold.

Specific balancing mechanism for the balancing of the tree structure that are based on the degree of filling known to the registration means are recited in these developments.

In an embodiment of the invention, there is provided the subdivision of the block lengths into sub-spectra is implemented according to the user-specific distribution of the request frequency for a specific block length.

This development assures that the tree structure is optimally adapted to the application and the access time thus remains minimum.

In an embodiment of the invention, there is provided an occupied management system (UBM) that manages the blocks occupied by a user system and sees to it that an image on a background memory is maintained for all used blocks.

According to this development, the memory management system is structured into two sub-systems. This sub-structuring makes it possible that the images to be conducted to a background memory for reasons of data protection remain limited to the occupied blocks.

In an embodiment of the invention, there is provided exchange means with which the previous static management structure is replaced by a new static management structure during operation.

This development places one in the position of introducing a new management structure into the memory management system that is better adapted to the application and thereby shortens the average search time.

These and other aspects and features of the invention are discussed in greater detail below in the following detailed description of the presently preferred embodiments with reference to the accompanying drawings.

DETAILED DESCRIPTION OF THE PRESENTLY PREFERRED EMBODIMENTS

Figures 1, 2:
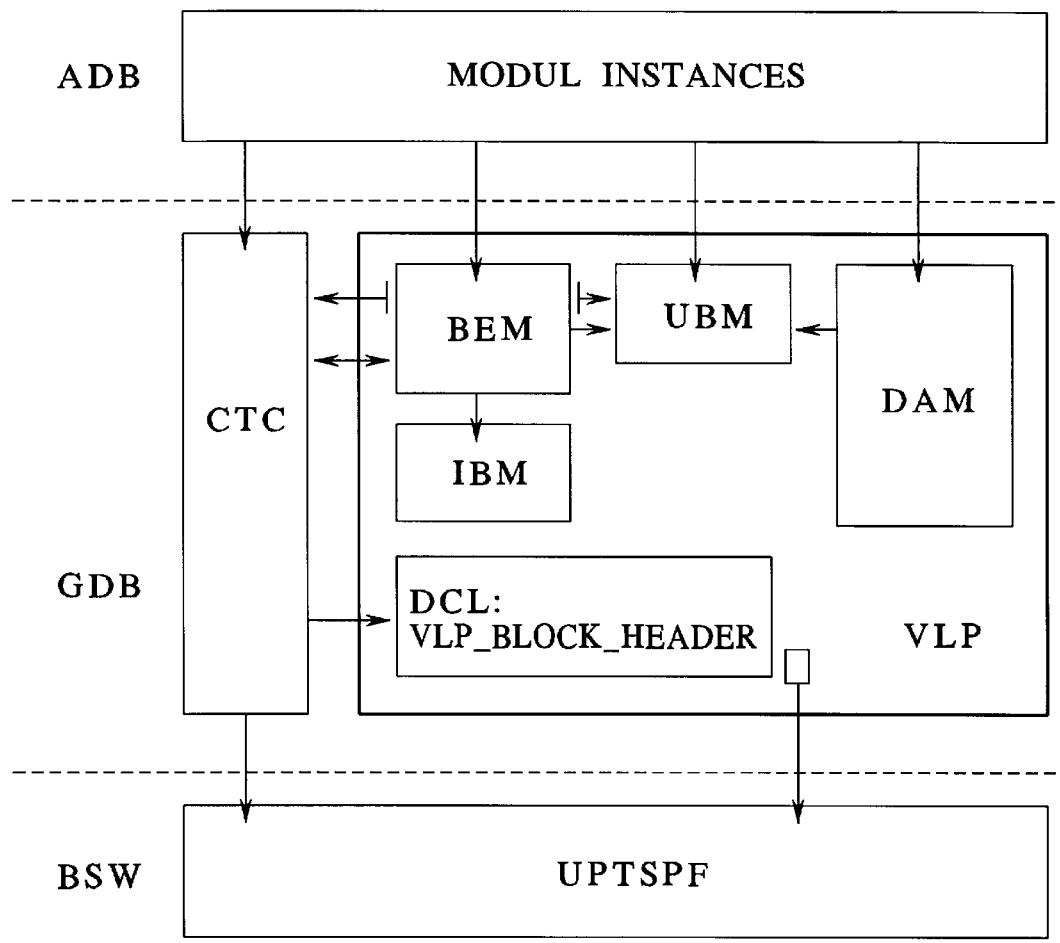
FIG. 1 is a block diagram of a memory management system.
FIG. 2 is a block diagram of a memory block header for the system of FIG. 1.

FIG. 1 shows in block diagram form the structure of a memory management system VLP that comprises a free memory management system IBM, an occupied memory management system UBM a block status control system BEM and an access control system DAM.

The memory management system VLP makes available a pool of memory blocks of variable lengths to a user system, for example the data modules (module instances) of a data management system. The free memory management system IBM thereby manages the free blocks and the occupied memory management system UBM manages the memory blocks already occupied (used) by a user system.

The occupied memory management system UBM manages the occupied memory blocks on the basis of a list, what is referred to herein as the occupied block list. The occupied block list mainly serves the purpose of encapsulating the data of a user system administered by the memory management system. All accesses of a user system to a memory block occupied by it thus ensue via the occupied block list that contains the linkage of a logical index used by the user system with a physical address of the memory block (the user system previously received the logical index used for addressing from the occupied memory system on demand and, by forwarding the logical index to the free memory management system, subsequently initiates the latter to have a free memory block found and reserved).

As already mentioned, the free memory management system IBM manages the free memory blocks of the memory management system. It thereby handles the search for a requested memory block, the splitting possibly required by a request of a memory block and the smelting possibly required after the release of a memory block. The search for a requested memory block ensues via a management structure that contains a statically pre-performed binary tree sorted according to length whose leaves represent the entry points into chains of free memory blocks.

In one modification, said chains of the binary tree could already be pre-filled with blocks before the activation (initialization) of the management structure, i.e. the free memory can already be divided. In another modification, the chains can still be empty before the activation and can be filled after the activation of the management structure by events during operation such as, for example, release, splitting or smelting of blocks.

The block status control BEM controls the status change of a memory block between the status of "occupied" and a status of "free" and, thus, controls the management-wise exchange of a block between the occupied management and the free management.

The access control system DAM controls the access to the data content of an occupied memory block in that it makes the necessary interface primitives available to a user system.

When the illustrated memory management system VLP is used within the framework of a multi-tasking system, it is necessary to mutually secure accesses onto the memory management system that occur parallel to one another. Over and above this, the write accesses to the background memory that occur in its own processes must be synchronized with the accesses to the memory management system. This competition monitoring and the assurance that a logically consistent status of the memory management system is available during the course of a plurality of logically related accesses, which are also referred to as a transaction, is assured by an access control system CTC.

The elementary units of the memory management system to be managed are the memory blocks. A memory block is essentially characterized by its location in the memory, its length and its status. These and additional information are combined into memory block headers BLK-H that represent the central management structures of the memory management system.

FIG. 2 shows the structure of such a memory block header BLK-H.

A data field PATTERN is used in order to enter the status of the appertaining memory block.

The possible states are "free", "occupied", and "reserved", whereby the two former statuses are self-explanatory and the "reserved" status identifies the transition between these two statuses.

The data field LENGTH serves the purpose of specifying the length of the memory block, whereby the particular is expressed in multiples of the minimum block length.

The two pointers PTR_NEXT_PHYS and PTR_PREV_PHYS physically chain neighboring blocks in the memory. These particulars have no significance for the actual memory management but are important for monitoring the integrity of the memory management system. It can be assured with these two pointers, namely, that blocks lost during rechainings between the free/occupied memory management IBM, UBM can be relocated and the desired status can be restored under certain circumstances.

The two pointers PTR_NEXT_LOG and PTR_PREV_LOG provide the reference to the logical successor or, respectively, predecessor of the respective block. Its specific significance is dependent on the momentary status of the block (see data field PATTERN). As long as a block is assigned to the free management IBM, it is involved in a doubly chained list of blocks of the same size, whereby the pointer PRT_NEXT_LOG references the last block in each chain back to the root of the this chain. When the block contains useful data, then it is addressed via a central code table. The back reference by the pointer PTR_PREV_LOG then indicates the corresponding entry.

The pointer for the logical forward reference for occupied blocks can accept a checksum provided for auditing. If it is necessary to distribute logically related data over a plurality of blocks, this pointer also serves the purpose of addressing the successor blocks and the checksum is then found only in the last block.

The functioning of the memory management VLP shall be set forth in greater detail below with reference to primitives of the memory management shown in FIGS. 3 and 4.

In combination with the aforementioned management structure of the block header BLK-H, the procedures relating to the primitives have the job of realizing the physical management of the memory blocks and making these invisible for the user of the memory management system. A distinction should thereby be made between external and internal procedures, whereby the former are distinguished by an interface known to the outside, i.e. known to a user system, whereas the latter merely represent functional units whose implementation is implicitly initiated as needed, i.e. is used within the framework of an external primitive.

The internal procedures shall be set forth in greater detail first, since the external procedures are supported on the internal procedures.

Figure 3:
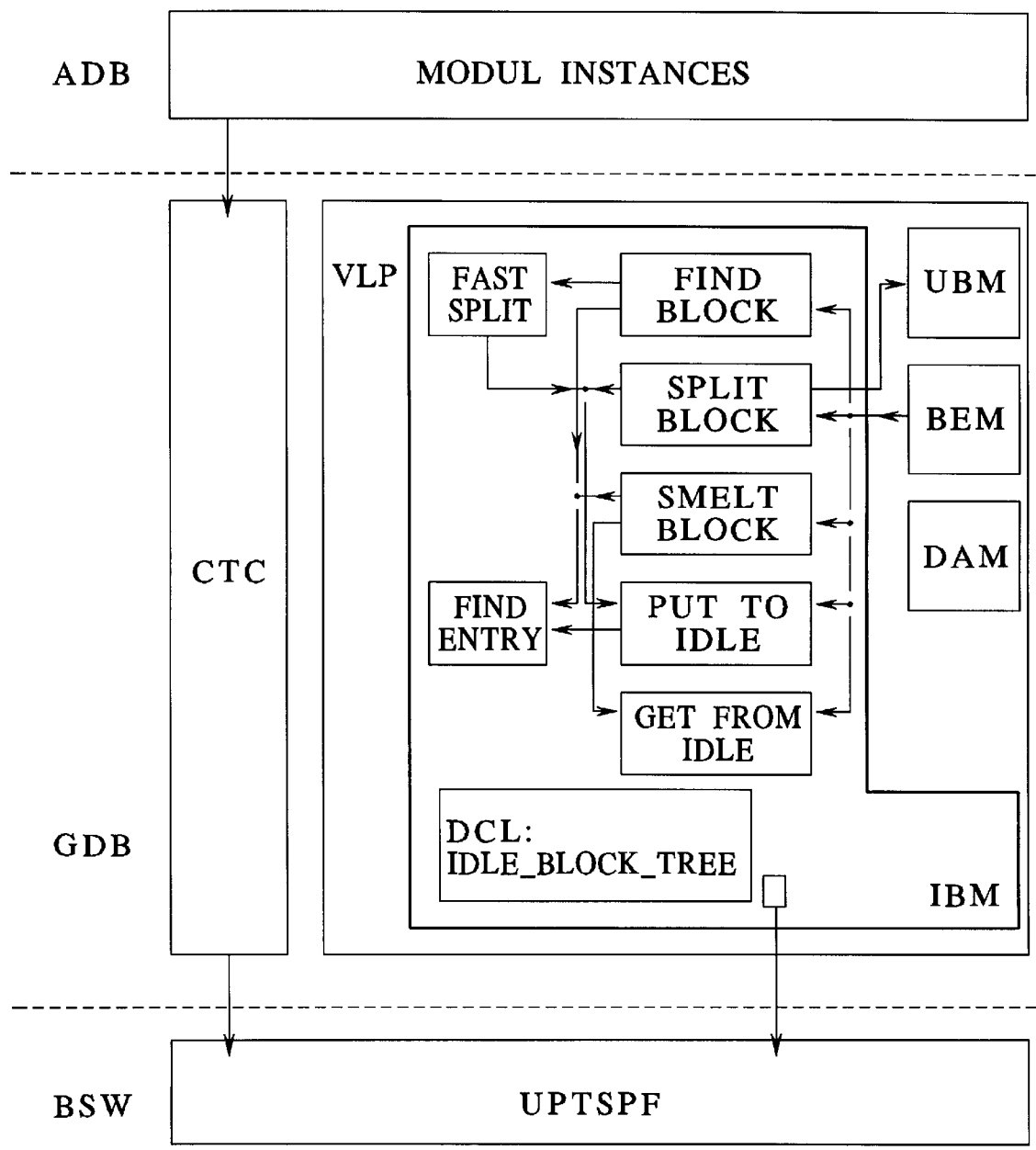
FIG. 3 is another block diagram of the memory management system of FIG. 1 with primitives of the free means management system.
Figure 4:
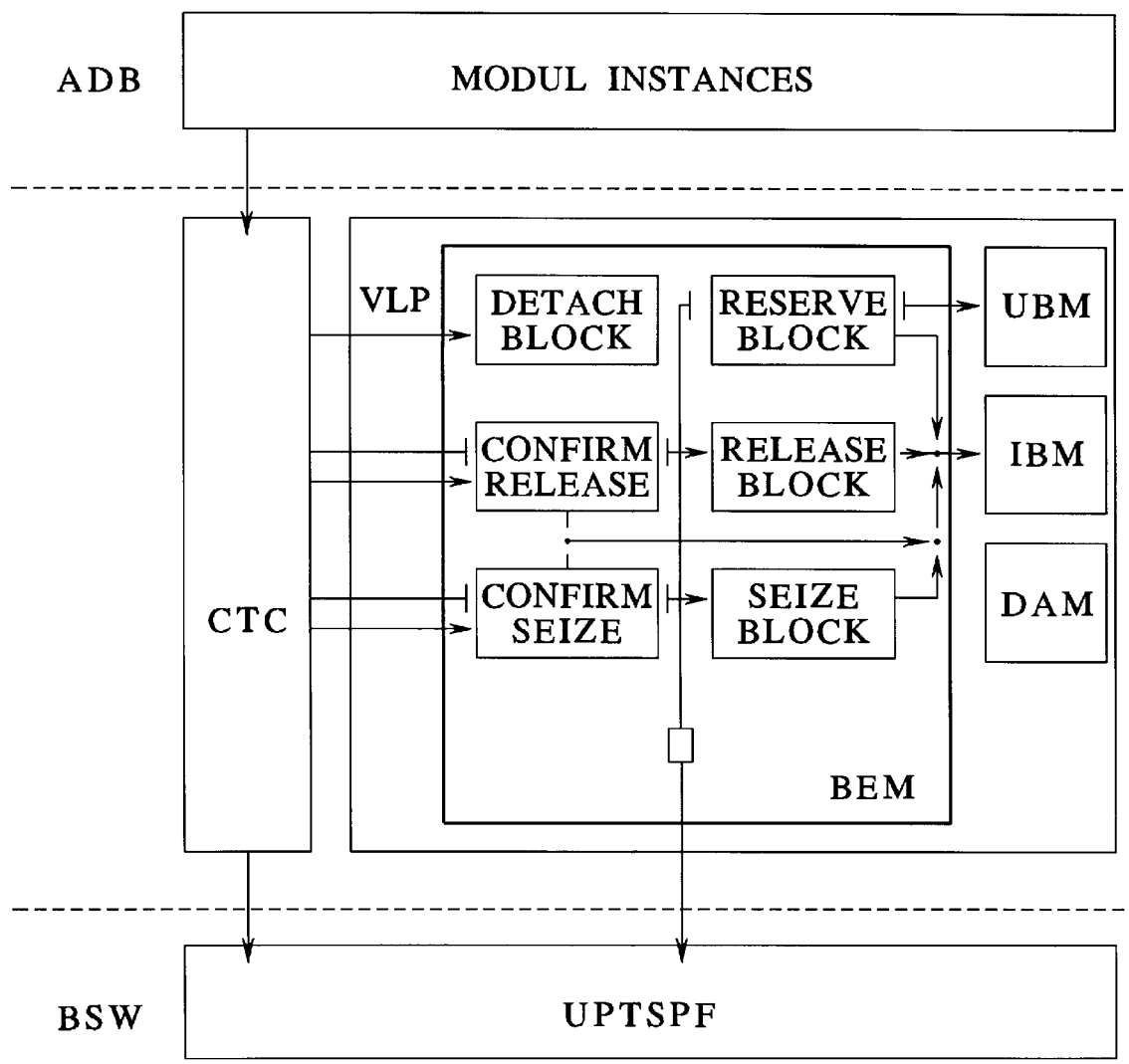
FIG. 4 is another block diagram of the memory management system of FIG. 1 with primitives of the block status control systems.

The internal procedures are shown in FIG. 3 and are contained in the free management IBM. When the free management is modified, then the implementationconditioned effects are limited merely to this set of procedures.

A procedure FIND_ENTRY looks for a beginning ENTRY of a chain of blocks of a given size. This procedure merely serves as a component of two procedures FIND BLOCK and PUT TO IDLE to be set forth in greater detail below.

The procedure FIND_BLOCK looks for a block of the given size. The more detailed execution of the search algorithm shall be set forth later. In the best case, this procedure finds a suitable block (namely in the chain found with the assistance of the procedure FIND ENTRY); otherwise, a block that is too large and selected as dexterously as possible, the PATTERN is set interruption-free to the status "reserved" and, in the case of a block that is "too large", is made known with the corresponding notation of the reference to this block.

The procedure PUT TO IDLE places a block under the free memory management IBM. First, the physical neighbors of the block to be made free are checked for their status. When a free neighbor is thereby found, a block status controller BEM is informed thereof. When no free neighbor is found—and only then!—, the free block is attached to the end of a double chain found with the assistance of the procedure FIND ENTRY and the PATTERN is modified to "free".

A procedure GET FROM IDLE takes a block from the free management. To that end, this block must be transferred out of a management chain in a suitable way and the PATTERN of the block header must be set to "USED". The removal ensues at the beginning of the chain.

A procedure SPLIT BLOCK splits a part of a block having a predetermined size off from a block. To that end, a new block header BLK-H must be compiled and the linkage to the physical neighbors must updated.

A procedure SMELT BLOCK smelts two physically neighboring blocks. The excess block header can be abandoned and the linkages to the physical neighbors must be updated.

Primitives of the external procedures shall be set forth in greater detail below, these being contained in the block status controller BEM and in the access controller DAM. FIG. 4 illustrates the procedures performed in the BEM.

A procedure RESERVE BLOCK allows a free block to be looked for and occupies this for the appertaining transaction in that it sets the PATTERN to the status "RESERVED". In view of the functionality, this procedure is based on the procedure FIND BLOCK. When a reserve block of the memory management system is thereby accessed, a SPLIT BLOCK with implicit PUT TO IDLE must be immediately implemented.

A procedure SEIZE BLOCK takes a previously reserved block from the free management and, if necessary, tailors it to the length actually required by block splitting. The fraction block is returned to the free management. Functionally, thus, a GET FROM IDLE is implemented first and then a SPLIT BLOCK is potentially implemented.

A procedure RELEASE BLOCK returns a block that is no longer required to the free management. When a free neighbor is present, a block smelting is initiated and the combined block is chained instead of the original block. When this situation is expressed by the internal procedures thereby implicitly used, then a PUT TO IDLE ensues first. When this procedure finds a free neighbor, then chaining is not immediately implemented but SMELT BLOCK is first called in and then another PUT TO IDLE—which is then "active".

When, in case of a multi-tasking environment of the VLP, a transaction in the course of a RESERVE BLOCK is conducted to the large fractional block, the free memory reserve, due to the lack of smaller, suitable blocks, then the entire reserve dare not be blocked. In this case, the block splitting must be immediately implemented. Otherwise, it is meaningful to only carry out the block splitting with the termination of a transaction in order to thus minimize the outlay in case of an occurring error and of the roll-back to be then accomplished, i.e. the restoration of the status before the beginning of the transaction.

As may be seen from FIG. 3, the procedures of the free memory management IBM are called by the block status controller BEM. The search for a free memory block is implemented by the procedure FIND BLOCK that implicitly calls the procedure FIND ENTRY in order, in a first step, to find a suitable management chain with a free block and which likewise implicitly calls the procedure FAST SPLIT in order to implement a potential fast splitting.

The access to the management chains for the free memory blocks ensues via the procedures PUT TO IDLE and GET FROM IDLE, whereby the former procedure again calls the procedure FIND ENTRY in order to find the right chain.

The splitting by the procedure SPLIT BLOCK and the smelting by the procedure SMELT BLOCK is likewise initiated by the block status controller, namely after the updating of the causative transaction, as a result whereof the roll-back to the status before the transaction is assured in case of an interruption.

The direct access controller memory DAM contains the procedures WRITE BLOCK and READ BLOCK (not illustrated). The procedure WRITE BLOCK writes user data—likewise upon additional employment of said update procedure—into a previously reserved block. The procedure READ BLOCK reads user data from a reserved block.

Figure 5:
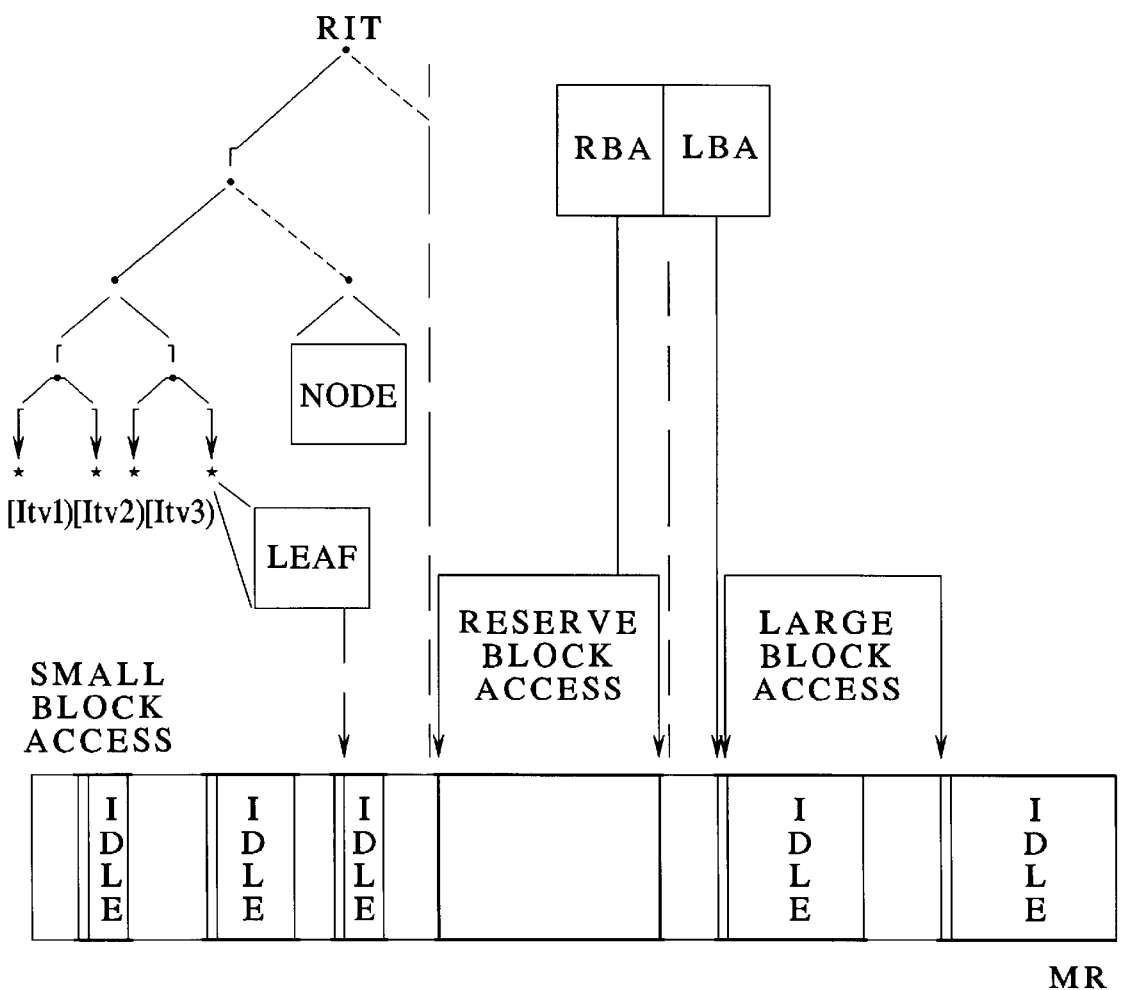
FIG. 5 illustrates a data structure utilized in the memory management system of FIG. 1.

The critical data structure of the free management, namely the management structure with which the access to the free blocks of the memory management system is organized shall be set forth in greater detail below with reference to FIG. 5.

The management structure can be divided into three parts, namely a first access structure RIT that leads to "small" blocks, a second access structure LBA that leads to "large" blocks and a third access structure RBA that leads to a reserve block. Whereas the second and third access structure only contain a few pointers, the first access structure contains a static binary tree.

The structure of the static binary tree is based on the predetermination that only block lengths with discrete values, i.e. multiples of a specific minimum block length, are allowed—at least for "small" blocks. Each leaf of the binary tree then addressing a chain of blocks with the same length, whereby the leaves are sorted via nodes according to the respective length of the blocks.

Apart from the limitation due to the granularity, a nearly best-fit search is guaranteed by said access structures. As a result of the binary tree structure, moreover, a very fast access is assured. The loss of free memory space that is caused by the introduced granularity is compensated by a multiple by an improved relationship between occupied and free memory space.

The access to a chain of "large" blocks ensues, as already mentioned, via a separate, second access structure. Said chain of "large" blocks is located at the end of the memory space MR managed by the VLP, whereby the selection ensues according to a best-fit search. Since it can be assumed that said chain is rather short, the traversal of the chain during a search will ensue in an acceptable time.

Differing from the "large" blocks, the "small" block are settled at the beginning of the memory space MR administered by the memory management system. It is also possible to smelt blocks in the memory of the "small" blocks and to thus exceed the maximum block length directly addressable via the first access structure. The last leaf of the binary tree therefore usually contains not only blocks of the recited block length but also larger block lengths that have arisen due to a smelting process.

The management for the reserve block (third access structure RBA) contains two pointers to the beginning and the end of the reserve block as well as to further pointers that address a block that was just split at the beginning or, respectively, at the end of the reserve block in order to promote a fast splitting and smelting.

The management of the "large" blocks (second access structure LBA) comprises two pointers to the beginning or, respectively, to the end of the chain of "large" blocks.

FIG. 6 again shows the first access structure, namely a statically pre-performed binary tree sorted according to lengths whose leaves represent the entry points in the chains of free blocks of identical size. The binary tree is subdivided into two levels for optimizing the dynamics (not shown in FIG. 5), namely into a main tree (see FIG. 6) and into sub-trees (see FIG. 7).

The main tree roughly subdivides a predetermined block length profile of the free memory into block length intervals ITV, whereas the sub-trees (second-level) subdivide the intervals into discrete block lengths, whereby the leaves of the sub-trees offer entry into chains Chn of blocks of identical length. The block lengths supported by this tree structure are statically predetermined and cause a certain granularity and a minimum block length to be defined. This apparent limitation proves extremely advantageous, this being set forth in greater detail below during the description of the structures and their functionality.

The plurality of intervals derives from the ratio between an upper limit above which all blocks are unspecifically treated as "large" and the desired granularity in the subdivision.

A "quasi" best-fit search is prompted in the framework of this granularity. The losses in memory space necessarily deriving at first due to the introduction of a granularity are over-compensated, on the one hand, directly by an increased occupation density (the graduated sizes fit better in one another) and, on the other hand, by a better system behavior overall that derives from the lower number of splittings required.

The subdivision of the free memory into length intervals ITV can ensue equidistantly or—with reference to a specific application—according to the distribution of the length profile of the application (user-specific request frequency of block length). When, for example, a specific interval by comparison to other intervals is selected extremely narrow, then only a few discrete block lengths will lie in this interval and the sub-tree subdividing this interval will thus comprise little depth in comparison to the sub-trees of the other intervals. The plurality of search steps for block lengths that lie in this interval thereby becomes smaller and the access thus becomes faster. The access time can thus be shortened in this way for block lengths that are frequently requested.

Independently of the subdivision ultimately selected, the last interval is to be selected open since it contains all blocks above the maximum value of the assumed length profile.

Figure 6:
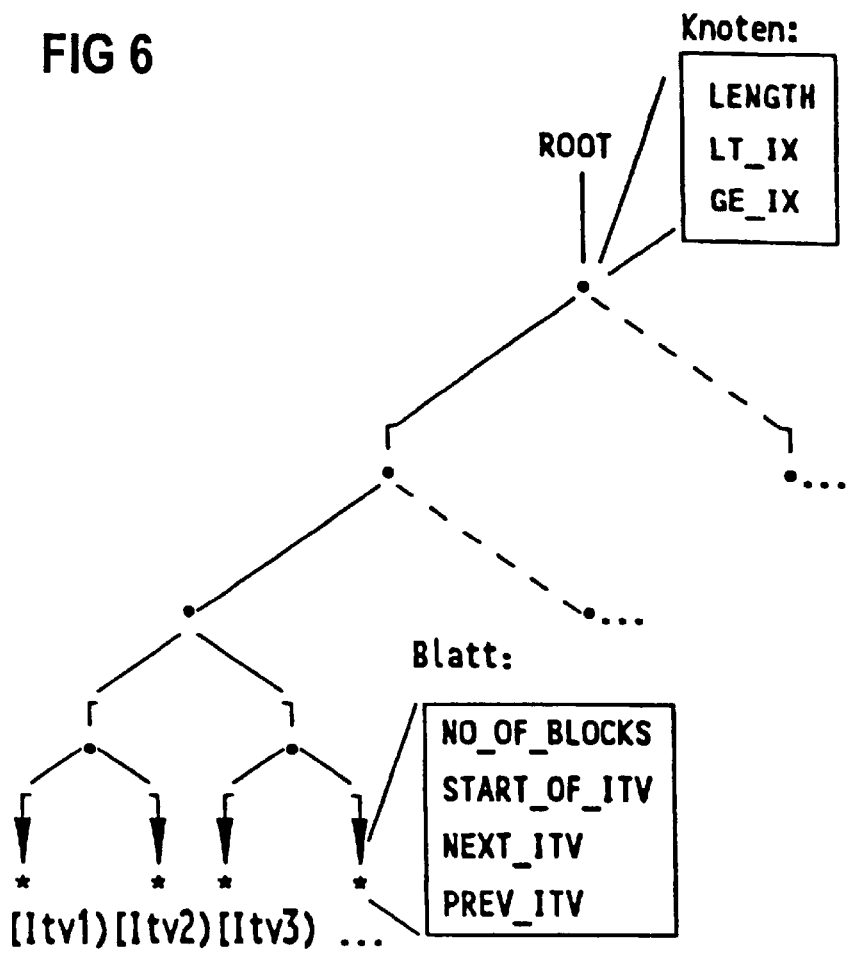
FIG. 6 illustrates a tree utilized in the memory management system of FIG. 1.

The nodes of the tree in FIG. 6 contain the information typical for each binary tree, namely a comparison length LENGTH that is compared to the respectively requested block length in the search, as well as a smaller-than reference LT IX and a larger-than reference GE IX (GE=greater or equal) to the two successor nodes/leaves.

The leaves of the tree in FIG. 6 contain fields for the total number of blocks currently available in this interval (NO OF BLOCKS), a reference to the entry into an interval-internal management structure (START OF ITV) and, in order to intercept the case of an "empty" interval (NO OF BLOCKS= 0), two further references (NEXT ITV, PREV ITV) to the neighboring leaves allocated to the next-higher/lower intervals.

When a subdivision into $2^n$ intervals is assumed, then $2^n$ leaves and two $2^n-1$ nodes, each having respectively four bytes, must be pre-performed for the main tree. A minimum block size must be defined as another static pre-performance. Proceeding from a fixed size of a block header that must contain the necessary management data, a reasonable value is obtained for the minimum block size when at least the same size is set again for the user data managed by the header. A block splitting is suppressed for smaller blocks. The smallest supported unit thus simultaneously corresponds to the granularity with which block sizes are offered at all.

The greatest possible plurality of block sizes with an interval derives from the ratio between interval width and the minimum block size.

Due to the definition of a smallest unit and the granularity connected therewith, a best-fit method in the strict sense is not implemented in the memory management system of the invention, for which reason the access method employed in the inventive memory management system can be best referred to as "quasi-best-fit method".

The definition of a smallest unit, however, has an enormous advantage over the best-fit method. As long as there are not too many requests of blocks having lengths that are smaller than this unit—and this must be assumed in practice—, this granularity de facto merely opposes the creation of extremely small, ultimately unusable blocks. An essentially better relationship between occupied and free memory space thus derives.

A respectively further, static, semi-permanent binary tree (sub-tree) is pre-performed leaf-internally (interval-internally) for each of the above-introduced intervals according to the possible block sizes, this binary tree (sub-tree) forming the second level of the binary tree and being attached under an (interval) leaf of the first level.

Figure 7:
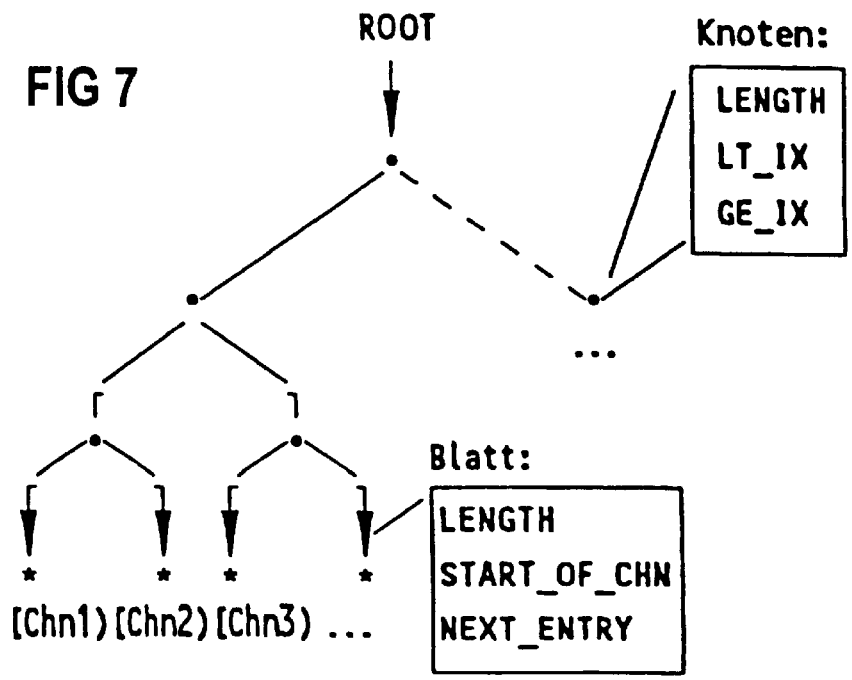
FIG. 7 illustrates a subtree of the tree illustrated in FIG. 6.

FIG. 7 shows a binary sub-tree that is attached under one of the (interval) leaves of the first level. The leaves of this tree contain an allocated length LENGTH that indicates the upper limit of the interval, a reference to the beginning (START OF CHN) or, respectively, to the end of a chain CHN (END OF CHN) of free blocks having the corresponding size and—in order to be able to react to the case of an "empty" chain (START OF CHN=ZERO)—a reference to the neighboring leaf (NEXT ENTRY) with the next size within this interval or, respectively, to the leaf of the next-higher interval in the higher-ranking binary tree or a "last interval" mark. The nodes are again composed of the above-described entries typical for binary trees.

When one assumes a division of the intervals into $2^m$ individual chains, then $2^m-1$ nodes having the size of four Bytes and $2^m$ leaves of twelve Bytes each must be pre-performed for the sub-tree.

When a switch is to be made during operation to a new subdivision adapted to the user (for example, narrow intervals in the areas of high request frequency), then this is relatively unproblematical insofar as the minimum block length can be retained. The new management structure is initially inactively prepared parallel to the operation on the old tree structures. When this preparation has been concluded, the management data for the reserve block and the "large" blocks can be taken from the old management structure into the new management structure and this can be activated. From this point in time, the operation with the new management structure is possible, even though with short-term losses in dynamics. During the further course, the chains of free blocks accessible via the old tree must be transferred little by little into the new tree. This transfer is implemented in the following way. For a specific time span (transition phase), a search is still carried out in the old management structure given a request for a free block. Further searching is carried out in the new management structure only when no free block is found therein. When a free block that, however, is too large is found in the old management structure, then this block that has been found is split and the split part is accepted by the new management structure. When a previously occupied block is released, then this, of course, is immediately accepted by the new management structure. After the expiration of the transition phase, finally, the free blocks remaining in the old management structure are transferred into the new management structure in a process that is independent of the user requests. The change to the new management structure has been accomplished with the end of this procedure.

The execution of the request of a block is now set forth in greater detail below.

In response to a request for a block having a specific length, the procedure FIND BLOCK is called. This procedure runs through the first access structure with the assistance of the procedure FIND ENTRY, namely the binary tree that has been described. Having arrived at a corresponding leaf of the main tree, the plurality of blocks available there is read out. When this number is unequal to zero (1>0), then the appropriate reference is forwarded to the interval-internal management. Otherwise (1=0), a reference is made to the neighboring interval or—for optimization purposes, which shall be set forth in greater detail later—to a different interval beneficial for the user. These two cases shall be set forth in greater detail below.

1>0: the corresponding size is sought in the interval-interval tree (quasi-best-fit!). When a block is found under this leaf, then the search procedure is terminated. When, however, no block is present under this leaf, then a reference can be made to the neighboring leaf within the same interval (or to a different leaf for optimization purposes) in order to thus find the next-larger block. In case all other chains are also empty, the last leaf of the interval points to the entry into the next interval. The first case distinction is repeated therein; now, however, it is certain for 1>0 that a useable block that will then generally have to be split will be found.

1=0: since no blocks are present in this interval, reference can be directly made to the next interval.

In order to enable the above-outlined decision (1>0 or 1=0), it would be adequate to pre-perform a bit instead of a counter. A counter, however, would offer advantages with respect to the auditing and statistical monitoring of the free management.

In the best case, a block meeting the demand is present (within the framework of the pre-performed granularity!), so that the access can ensue fast and directly via the pre-performed, static binary tree.

The worst case occurs when a block is requested whose size corresponds to twice the minimum size and when blocks having the minimum size are in fact present but no other blocks are present in the free management (apart from said reserve block). All interval counters other than those of the first and of the last interval are thus at zero in this case.

Given this pre-condition, the request enters into the first interval and finds the empty entry in the corresponding leaf, whereupon it is handed within the interval over the entire width thereof (—two leaves). Having arrived at the end thereof, the jump to the entry into the next interval ensues. Since, as per assumption, no blocks are available in this or in the following intervals, the request will be cross-referenced up to the end of the higher-ranking tree (main tree) in order to find the reserve block there and split the corresponding piece off.

The normal case will lie between said two extreme cases; however, it is possible to keep this normal case extremely close to the ideal case on the basis of suitable measures (prescribing the interval interleaving, prescribing a standard block distribution, designational splitting, etc.).

When a leaf having a non-empty chain is ultimately found, then a block at the beginning of this chain is marked as reserved (PATTERN="RESERVED"). When this block is not the VLP reserve, then—in case of a multi-tasking environment—a wait is undertaken for the block to be written before a splitting necessary under certain circumstances, the SPLIT BLOCK procedure ensues. This, however, must ensue without delay for the VLP reserve so that this is available for further requests. The block acquired in this way is ultimately transferred out in that the initial pointer of the leaf (START OF CHN) to the following leaf is set and the back reference thereat and the counters therein and in the interval leaf are modified.

In the release of a block, the physical neighbors of the block to be released (PATTERN="FREE") are first examined for their status. When one of the neighbors or both are free (PATTERN="FREE"), then a block smelting is implemented with the SMELT BLOCK procedure.

Via the above-described trees, the leaf corresponding to the block to be subsequently released in terms of size is sought for said block. This search, of course, is always immediately successful. The entering into the chain thereat ensues at its end upon utilization of the reference END OF CHN in this leaf. The counters in the leaves must analogously be counted up.

Let it be pointed out that the search upon release of a block is an additional outlay but the necessary consequence of the predetermined order structure. The plurality of search steps, however, is especially low in the inventive memory management system.

The dynamic execution shall be set forth in greater detail below with reference to an example.

A uniformly distributed length profile shall be considered as the simplest distribution; the upper limit of the spectrum is assumed to be 256 kbyte. The size of a block header is assumed to be 16 bytes (minimum expansion of the block header, i.e. without PTR NEXT PHYS and PTR PREV LOG, as in FIG. 2); the minimum block size and, thus, the granularity lie at 32 bytes:

| | | |
|---|---|---|
| Lmax: | 256 kByte | (Spectrum Upper Limit) |
| Lmin: | 32 Bytes | (Minimum Block Size) |
| Gran: | 32 Bytes | (Granularity) |

The block length spectrum should be divided into 256 equidistant intervals having the width of 1 kB; the tree thus has a depth of eight nodes; the interval width of 1 kB together with the granularity of 32 Bytes yields 32 possible lengths per interval; the sub-trees are thus each respectively five nodes deep:

| | | |
|---|---|---|
| IntB: | 1 kByte | (Interval Width) |
| HBT: | 8 | (Depth of the Main Tree) |
| UBT: | 5 | (Depth of the Sub-Trees) |
| NInt: | 32 | (Plurality of Possible Lengths Per Interval) |

The statically predetermined part of the free management is thus known, namely a main tree having the depth HBT=8 and 256 interval-interval sub-trees having the depth UBT=5. The space requirement to be pre-performed amounts to about 130 kB:

| | | | |
|---|---|---|---|
| Main Tree | $2^8$ | Intervals | |
| (first level) → | $2^8 - 1$ | Nodes of 4 Bytes each: | 1 kByte |
| | $2^8$ | Leaves of 4 Bytes each: | 1 kByte |
| | | | 2 kByte |
| Sub-Tree | $2^5$ | Chains per interval | |
| (second level) → | $2^5 - 1$ | Nodes of 4 Bytes each: | 128 Bytes |
| | $2^5$ | Leaves of 12 Bytes each: | 384 Bytes |
| | | | * $2^8$ Intervals |
| | | | 128 kByte |
| | | → Total: | 130 kByte |

In the best case, a specific block is thus found after 13 search steps; in the worst case, 334 search steps are required, this being shown again in brief below.

| | | |
|---|---|---|
| Best Case: | 8 | (Depth of the Main Tree) |
| | +5 | (Depth of the Sub-Tree) |
| | 13 search steps | |
| Worst Case: | 8 | (Depth of the Main-Tree) |
| | 5 | (Depth of the Sub-Tree) |
| | $2^5 - 2$ | (Width of the Sub-Tree) |
| | $2^8 - 1$ | (Width of the Main Tree) |
| | 5 | (Depth of the Sub-Tree) |
| | $+2^5 - 1$ | (Width of the Sub-Tree) |
| | 334 Search Steps | |

The illustrated worst case is certainly extremely rare, for which reason the average search time lies close to the ideal case (13 search steps).

Upon release of a block, this must be given to the corresponding leaf of the free management. In the present example, 13 search steps are required for this purpose.

Various mechanisms for optimizing the search times or, respectively, search steps shall be set forth below, these mutually supplementing one another.

One strategy is comprises simply not referencing the direct neighbors when finding an empty chain but instead referencing such that a fraction more beneficial with respect to the balancing unit of the tree remains as free block after a block splitting to be carried out.

For the specific realization of this strategy, for example, the next interval or, in general, a different interval can be directly referenced instead of referencing the next neighboring chain within an interval at the end of the empty chain. Instead of a following interval, likewise, a leaf selected according to the application-specific distribution can be the direct goal of such a reference. The two forms of realization assure that, dependent on the intelligence of the reference structure, a usable fractional block is again available after a block splitting. Said strategy can be best referred to as "look ahead splitting".

A further strategy comprises suppressing a smelting of free blocks having block lengths that are already constantly requested. This strategy can best be referred to as "look back splitting".

A further strategy comprises re-filling relatively empty chains in a procedure that is independent of the individual requests (transactions). This transaction-independent splitting can preferably be implemented during low traffic times, for example at night, in order to thus not negatively influence the system behavior. A specific realization of the strategy is comprised therein that a transient shadow table is made available for a table containing the leaves of the second tree level, this transient shadow table containing a time mark of the last request to this leaf and/or a counter for the contained blocks. When this table is scanned, then how frequently blocks of a specific time are used can be read on the basis of the time mark and whether such blocks are still present in an adequate amount can be read on the basis of the counter. When, due to too low a filling degree, the chain belonging to a leaf is to be filled, then a block that corresponds to the multiple of the soft block is divided into several parts and the sub-blocks which have arisen in this way are introduced into this chain (the filling degree is a quantity that describes the ratio between momentarily existing and statically predetermined plurality of blocks).

Said strategies shorten the search times since the probability of satisfying a request in the shortest possible search time is enhanced by the intentional generation or, respectively, retention of frequently required block sizes.

Moreover, the dynamics of the occupied management is implicitly enhanced by said strategies in that the average plurality of updating events onto the background memory is lowered per request. This reduction can be attributed to the lower number of necessary splittings on average.

The effect of decreasing updating events is particularly intensified when smaller blocks of the same size are generated in a single action from a larger block k. The effect of this strategy compared to the k splittings to be normally implemented shall be set forth in greater detail below, whereby the number of updating events indicated in parentheses refers to the minimum expansion of the block header structure and leaf structure.

In the case of the k splittings to be normally implemented, one splitting is initiated at every call of the procedure SEIZE BLOCK. The header of the original block is thereby modified (pattern, length, etc.), the logical predecessor and successor thereof are updated, a new header is generated for the fractional block, the back reference of the physical successor must be modified with reference to this fractional block, and the new block must be accepted into the free management (logical predecessor and end pointer of the free chain):

| | |
|---|---|
| Old Header: | k |
| Logical Predecessor: | k |
| (Logical Successor: | k) |

-continued

| | |
|---|---|
| New Header: | k |
| (Physical Successor: | k) |
| Logical Predecessor: | k |
| (End Pointer Free Chain: | k) |
| Number of Updating Events: | 7*k (4*k) |

Given application of said strategy, by contrast, a large block is divided into k smaller blocks of identical size and k SEIZE BLOCK calls subsequently ensue, these then already managing without splitting. When splitting the large block, k new headers are generated; overall, only one physical successor must thus be updated; the entire chain is allocated to the same leaf, for which reason respectively only one logical predecessor or, respectively, successor need be modified. The corresponding headers and the logical references are to be respectively processed for the seizes:

| | |
|---|---|
| New Header: | k |
| (Physical Successor: | 1) |
| Header: | k |
| Logical Predecessor: | k |
| (Logical Successor: | k) |
| Number of Updating Events: | 4*n + 1 (3*n) |

Although modifications and changes may be suggested by those skilled in the art, it is the intention of the inventors to embody within the patent warranted hereon all changes and modifications as reasonably and properly come within the scope of their contribution to the art.

We claim:

1. A memory management system for a computer system that manages free memory of the computer system in the form of blocks and makes these blocks available on request to a user system, the memory management system having a management structure comprising a static tree structure having end nodes under which blocks of the free memory are accepted, and which is subdivided into hierarchic tree levels, whereby a node of a tree level subdivides a spectrum of block lengths predetermined by its higher ranked parent node into subspectra of block lengths for its lower ranked offspring nodes.

2. The memory management system according to claim 1, characterized in that a node of the lowest ranking tree level subdivides the spectrum predetermined for it into discrete block lengths, whereby the discrete block lengths are statically predetermined and respective blocks of a specific, discrete block length are accepted under an end node of said tree structure.

3. The memory management system according to claim 1, characterized in that the static tree structure is a binary tree structure.

4. The memory management system according to claim 1, further comprising an occupied memory management system that manages blocks occupied by a user system and sees to it that an image is maintained for all used blocks on a background memory.

5. The memory management system according to claim 4, characterized in that the subdivision of the block lengths into subspectra is implemented according to a user-specific distribution of the request frequency for a specific block length.

6. The memory management system according to claim 1, having exchange means by means of which the static management structure can be replaced by a new static management structure during operation of the computer system.

7. The memory management system according to claim 1, characterized by a splitting mechanism that implements a block splitting before every allocation of a found block to a user system when the found block does not comprise the requested block length; and by a smelting mechanism that checks after every release of a block by a user system to see whether a block physically neighboring this block is likewise free and, insofar as this is the case, smelts the two blocks to one another.

8. The memory management system according to claim 7, characterized by a reference mechanism that references the next subspectrum for the continuing search when encountering an empty block length.

9. The memory management system according to claim 7, characterized by a reference mechanism that references a k-fold block length when encountering a block length that has been requested and splits the block found under the k-fold block length into smaller k blocks before the allocation to the user system.

10. The memory management system according to claim 1, characterized by a container structure for accepting blocks having a specified block length and a registration means that registers the degree of filing of the container structure and/or registers the request frequency of blocks of a specific block length.

11. The memory management system according to claim 10, characterized by a filling mechanism that refills the container structure with blocks by block splitting when the degree of filling falls below a specific threshold.

12. The memory management system according to claim 10, characterized by a suppression mechanism that suppresses the smelting of a block that has been released with a physically neighboring block when the degree of filling of the container structure belonging to the released block falls below a specific threshold.

13. A memory management system for a computer system comprising a free memory management system that manages free memory of the computer system in the form of blocks and makes these blocks available on request to a user system, the memory management system having a management structure comprising a static tree structure having end nodes under which blocks of the free memory are accepted, the free memory being subdivided into discrete block lengths, whereby the discrete block lengths are statically predetermined and respective blocks of a specific, discrete block length are accepted under an end node of said tree structure.

14. The memory management system according to claim 13, characterized in that the static tree structure is a binary tree structure.

15. The memory management system according to claim 13, further comprising an occupied memory management system that manages blocks occupied by a user system and sees to it that an image is maintained for all used blocks on a background memory.

16. The memory management system according to claim 13, having exchange means by means of which the static management structure can be replaced by a new static management structure during operation of the computer system.

17. A memory management system for a computer system comprising:

a free memory management system that manages free memory of the computer system in the form of blocks and makes these blocks available on request to a user system, the memory management system having a management structure comprising a static binary tree structure having end nodes under which blocks of the free memory are accepted, the free memory being subdivided into discrete block lengths, whereby the discrete block lengths are statically predetermined and respective blocks of a specific, discrete block length are accepted under an end node of said tree structure; and an occupied memory management system that manages blocks occupied by a user system and sees to it that an image is maintained for all used blocks on a background memory.

18. The memory management system according to claim 17, having exchange means by means of which the static management structure can be replaced by a new static management structure during operation of the computer system.

19. The memory management system according to claim 17, characterized in that said tree structure is subdivided into hierarchic tree levels, whereby each tree level subdivides the free memory into blocks having a spectrum of block lengths predetermined by tree level rankings and the lowest ranking tree level subdivides the spectrum predetermined for it into discrete block lengths, and whereby the end node of a tree of a tree level respectively contains information about the plurality of free blocks available overall under this end node.

* * * * *